Sept. 8, 1931. J. W. JOHNSTON 1,822,814
METHOD OF MAKING BRAKE DRUMS
Filed April 13, 1927
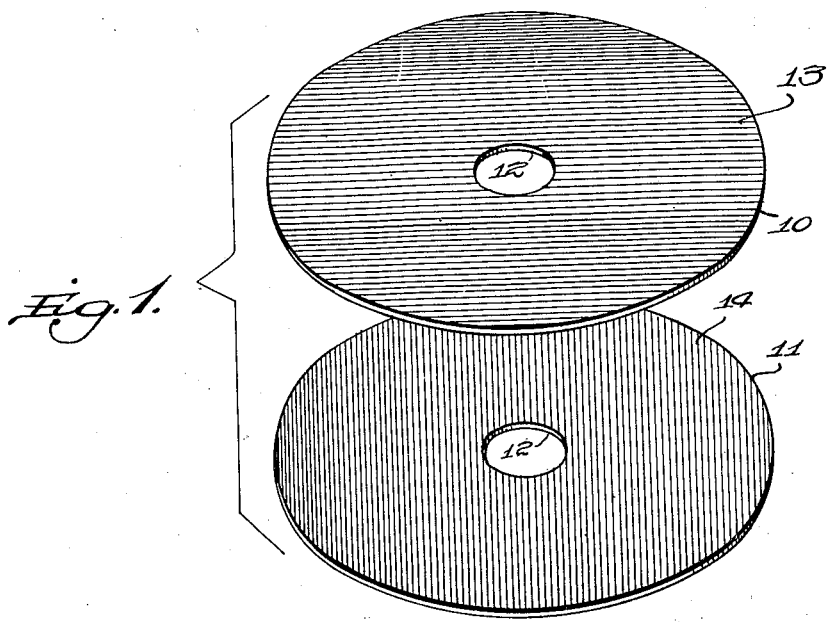
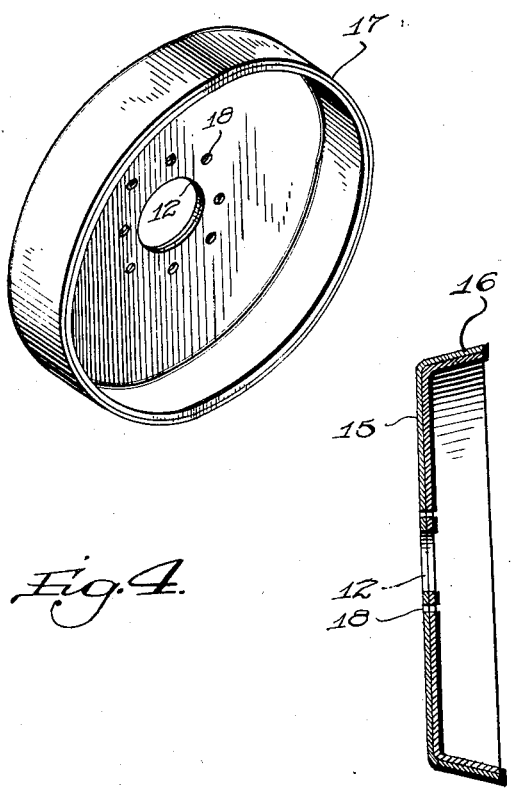
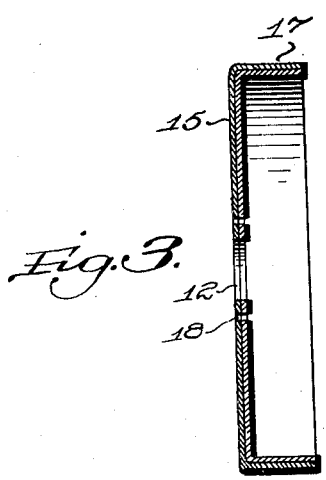
Inventor
JOSEPH W. JOHNSTON
By C. H. Parker
Attorney Patented Sept. 8, 1931

1,822,814

UNITED STATES PATENT OFFICE

JOSEPH W. JOHNSTON, OF STEUBENVILLE, OHIO

METHOD OF MAKING BRAKE DRUMS

Application filed April 13, 1927. Serial No. 183,558.

This invention relates to brake drums and the method of making the same.

In the manufacture of brake drums for motor vehicles, it has been found to be extremely difficult to construct a drum, the brake engaging flange of which is exactly cylindrical. It has been the common practice in forming such drums to employ rolled steel sheets from which suitable patterns are cut to form blanks, and these blanks are stamped or otherwise shaped to form the finished drum. It is well known that sheet steel, in the process of manufacture acquires a grain and that on account of this grain the co-efficient of expansion of the metal is different in the direction of the grain from its co-efficient at an angle to the grain. On this account the brake engaging flanges of the brake drums made from a single sheet, as has heretofore been customary, cannot readily be made exactly cylindrical and even if so made will not remain exactly cylindrical, when subjected to changes in temperature. The material from which the drum is made is necessarily heated during the process of manufacture and also is heated by friction with the brake shoes when in use, so that it tends to lose its exactly cylindrical form. This results in the serious disadvantage that the shoes do not properly engage the flange on the drum.

An object of the present invention is to provide a method of making brake drums which have brake engaging flange portions substantially exactly cylindrical and which will retain their form when subjected to changes of temperature extending over a relatively wide range.

A further object is to provide a method of making brake drums which involves the forming of the drum from a plurality of laminations of sheet steel arranged with the grain of laminations at such angles with respect to each other that the finished drum, and particularly the brake engaging flange thereof, expands and contracts substantially equally in all directions, with changes in temperature, whereby the flange may be maintained substantially cylindrical.

A further object is to form a brake drum by simultaneously stamping a plurality of laminations of sheet metal whereby the laminations have their surfaces pressed into extremely intimate contact.

An additional object is to equalize the expansion and contraction of a brake drum with change of temperature.

A still further object is to render a brake drum substantially aperiodic.

A feature of the invention relates to a brake drum comprising a plurality of laminations or layers of sheet metal having their surfaces pressed into intimate contact, the grain of the respective laminations being at such angles with respect to each other that the drum expands and contracts substantially equally in all directions and, hence remains substantially exactly cylindrical with changes in temperature.

An additional feature is a drum of the character mentioned comprising a plurality of metal sheets or laminations attached together in such manner that tone vibrations in the drum are materially damped or substantially prevented.

Broadly the invention relates to the method of making brake drums which involves the simultaneous stamping of a plurality of sheet metal patterns, the patterns being positioned with the grain in each at an angle with respect to the others; the laminations being pressed into intimate contact, whereby the resulting brake drum has a substantially exactly cylindrical flange adapted to retain its cylindrical form when subjected to changes in temperature, the drum also having substantially no audible natural period of vibration.

Other objects and advantages of the invention will become apparent during the course of the following description.

In the drawings, one embodiment of the invention is shown by way of illustration of the practice of the method above referred to. In this showing, Fig. 1 is a perspective view of a pair of blanks which may be employed in the manufacture of the drum;

Fig. 2 is a perspective view of the finished drum;

Fig. 3 is a central sectional view taken through the finished drum axially thereof, and Fig. 4 is a similar view showing the drum as removed from the die.

In the practice of the method, I prefer to use two or more sheets of rolled sheet steel; the thickness of the metal depending upon the number of sheets employed for making the finished drum, as will become apparent. These sheets are cut to form suitable blanks from which the finished drum is made. In Fig. 1 of the drawings I have shown a pair of blanks 10 and 11 stamped or cut from the sheet material employed. These blanks are provided with the usual central openings 12, as shown. After the blanks are cut, they are arranged with respect to each other in such a manner that the direction of the grain in one blank is at an angle with respect to the grain in the other, as illustrated at 13 and 14. The blanks are preferably arranged with the grain in one substantially at right angles to that of the other. When two sheets of the material are employed in the manufacture of a drum, the thickness of the sheets employed is preferably such that when the blanks are placed face to face, their combined thickness will equal the desired thickness of the resultant drum to be described. In Fig. 1 two sheets employed in making the drum are shown positioned so that the grain in one is at right angles to that of the other. It should be understood, however, that any number of the sheets may be employed, and when more than two sheets are used the grains are preferably arranged at equal angles with respect to each other. For instance, if three sheets of material are employed in making the drum, the grains of the sheets preferably are arranged 120 degrees apart.

After the blanks are formed in the manner referred to they are superimposed and stamped to provide a semi-completed drum as illustrated at 15 in Fig. 4, of the drawings. In the stamping process sufficient pressure is applied to the blanks to press their surfaces into very intimate contact with each other. It is found in practice that in drums made according to this process the laminations are invisible and that no attaching or retaining means other than the resulting cohesion of the laminations is required to hold them together.

The semi-completed drum is provided with a slightly conical flange 16. In order to form the semi-completed drum referred to, the plates or blanks are heated to a suitable temperature to render them easily ductile after which they are placed together with the grains of the blanks arranged in the manner set forth above. The ductile plates are then stamped in a suitable die, and the flange 16 is left slightly conical to permit ready removal of the cameo die from the semi-completed drum, and to permit removal of the latter from the intaglio die.

The final step in the manufacture of the drum lies in the alteration of the shape of the flange 16 to render it truly cylindrical as illustrated at 17 in Figs. 2 and 3. This may be done in a suitable rolling machine, as will be apparent. Openings 18 for the attachment of rivets or bolts may be formed in the drum either after it is wholly completed or while it is in the semi-completed state illustrated in Fig. 4.

From the foregoing it will be apparent that the present method contemplates the use of a plurality of metal sheet the grains of which are at different angles with respect to each other whereby a finished cylindrical flange may be formed in the manner referred to and which flange will be truly cylindrical in the finished article and which will retain such cylindrical shape indefinitely. As a resultant product, a brake drum is provided in which the coefficient of expansion is substantially equal in all directions, whereby the heat treatment employed in its manufacture and the temperature changes to which it is subjected in use will not cause any alteration in the true cylindrical shape of the flange, because all parts thereof expand and contract equally. A greatly improved braking action is thus obtained, the brake shoes or bands equally engaging and gripping the flange of the finished drum throughout its circumference. It has also been found that the laminations employed serve to dampen and eliminate tone vibrations in the drum. Drums made according to the herein described process are found to be substantially tone dead when struck, whereas the ordinary one piece drum gives off a ringing tone similar to that of a bell.

It is to be understood that the form of the invention and the method of practicing the same, herewith shown and described, are to be taken as preferred examples of the same, and that various changes in the shape, size and arrangement of parts and the method of practicing the invention may be resorted to without departing from the spirit of the invention or the scope of the subjoined claims.

I claim:

1. The method of making brake drums which consists in superimposing a plurality of metal blanks to form a partially completed drum with the grains of the blanks running at angles with respect to each other, and forming a cylindrical brake band engaging flange on such partially completed drum.

2. The method of making brake drums which consists in superimposing a plurality of metal blanks with the grains thereof running at angles with respect to each other, and forming the outer portions of such superimposed blanks into a cylindrical brake band engaging flange.

3. The method of making brake drums which consists in superimposing a plurality of metal blanks to form a partially completed drum with the grains of the blanks running at equally spaced angles with respect to each other, and forming a cylindrical brake band engaging flange on such partially completed drum.

4. The method of making brake drums which consists in heating a plurality of metal blanks to render them ductile, superimposing the blanks to form a partially completed drum with the grains of the blanks running at angles with respect to each other, and forming the outer portion of such partially completed drum into a cylindrical brake band engaging flange.

5. The method of making brake drums which consists in heating a plurality of metal blanks to render them ductile, superimposing the blanks with the grains thereof running at equally spaced angles with respect to each other, stamping the outer portions of such superimposed blanks to form an annular flange, and rolling such flange into cylindrical form.

6. The method of making brake drums which consists in forming a pair of blanks from rolled metal sheets, superimposing the blanks with the grains thereof running at right angles to each other, and forming the outer portions of such superimposed blanks into a cylindrical brake band engaging flange.

7. The method of making brake drums which comprises simultaneously stamping a plurality of superimposed laminations to form a partially completed drum, and forming a cylindrical brake band engaging flange on such partially completed drum.

8. The method of making brake drums which comprises forming a plurality of sheet metal blanks simultaneously into intimately interfitting elements in the form of a partially completed drum, and shaping the outer portions of said partially completed drum into a substantially cylindrical form.

9. The method of making brake drums which comprises superimposing a plurality of heated metal blanks with the grains of the blanks running at right angles with respect to each other, and forming said blanks into a cylindrical flanged disk.

In testimony whereof I affix my signature.

JOSEPH W. JOHNSTON.